3,062,814
NEW INDAZOLOTRIAZOLYL STILBENE BRIGHTENERS SOLUBLE IN ORGANIC MEDIA

Bennett G. Buell, Somerville, N.J., assignor to American Cyanamid Company, Stamford, Conn., a corporation of Maine
No Drawing. Original application Mar. 11, 1959, Ser. No. 798,604. Divided and this application Mar. 16, 1960, Ser. No. 15,270
2 Claims. (Cl. 260—240)

This invention relates to new stilbene triazole derivatives for use as optical bleaching agents in synthetic resins and other organic materials More particularly, it relates to compounds of the formula

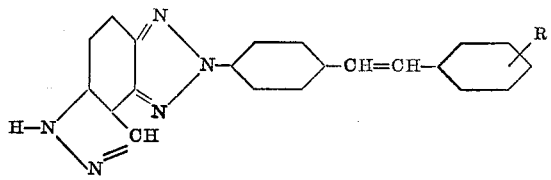

in which R is hydrogen, chloro, bromo or lower alkyl.

The use and mode of action of brighteners or optical bleaching agents in the textile field is well known. A large market has developed with such agents. However, because of their properties (especially solubility and light fastness) the agents used in the textile field are not suitable for general use in organic systems, especially in polymeric plastic compositions and in fats, oils and waxes and the like. In such compositions there is a definite need for agents which will brighten the clarity and overcome a dull appearance or yellow color. Thus, in the case of plastics, such agents would increase the clarity of transparent plastics, the whiteness of opaque plastics which have been loaded with white pigment and the brightness of colored plastics of pastel shades. It is well known, furthermore, that certain plastics such as cellulose acetate and polyvinyl chloride normally have a yellow tinge when first prepared and would therefore profit by the inclusion of such agents.

One of the more important classes of textile brighteners is that of the monotriazolyl stilbene derivatives. A number of derivatives of such a ring structure have been described as the optical bleaching agents for cloth. There has also been recently described an optical bleaching agent for plastics, of the triazolyl stilbene structure, in which the sulfonic acid groups of the textile brightener are converted into ester or amide groups. These however, have not proved to be fully satisfactory since they are found to be quite weak in fluorescence.

I have found that certain triazolyl stilbene brighteners having specific substituents in specific places in the molecule, completely lacking any sulfonic acid substituent, are excellent brighteners for resins, oils, fats, waxes and the like. This new class of brighteners of my invention are much stronger as brighteners for plastics than the heretofore known sulfonic ester and sulfonamide derivatives of triazolyl stilbene compounds. The class of compounds which fall within the scope of my invention comprise compounds of the formula

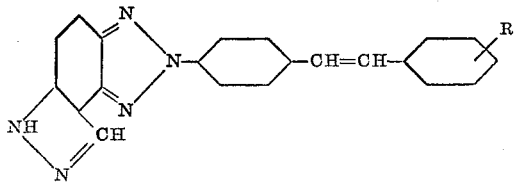

in which R is hydrogen, chloro, bromo or lower alkyl. Especially preferred is the compound

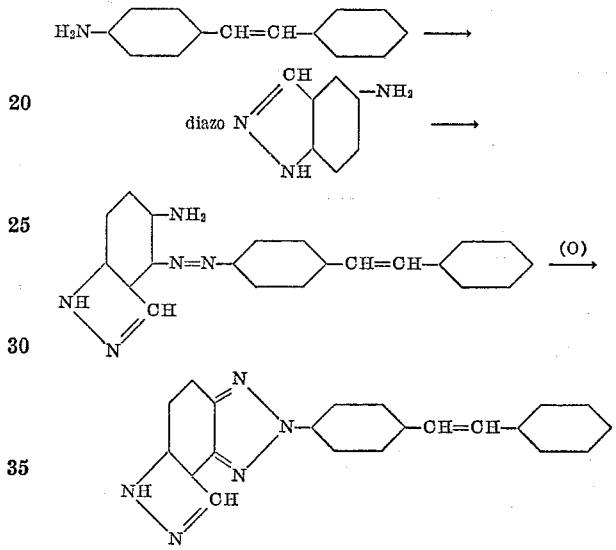

The compounds of my invention can be prepared by a number of methods. The most convenient method involves the diazotization of a 4-aminostilbene or the proper 4-aminostilbene derivative and coupling the diazo into an aminoindazole of the proper structure, followed by oxidation of the o-aminoazo compound to 4-triazole. This synthesis can be illustrated by the following equation.

Stilbenes which may be used in the synthesis of the compounds of my invention include the following 4-aminostilbene
4-amino-2'-chlorostilbene
4-amino-3'-chlorostilbene
4-amino-4'-chlorostilbene
4-amino-2'-methylstilbene
4-amino-3'-methylstilbene
4-amino-4'-methylstilbene
4-amino-2'-bromostilbene
4-amino-3'-bromostilbene
4-amino-4'-bromostilbene
4-amino-2'-ethylstilbene
4-amino-2'-butylstilbene
4-amino-4'-propylstilbene
4-amino-3'-methylstilbene The coupling component in the synthesis of the compounds of my invention is 5-aminoindazole.

The compounds of the invention, because of their blue fluoroescence effects may be used as optical bleaching agents for a variety of organic systems. Thus, because of their desirable solubility, fluoroescence effects, and light stability, they can be used as fluorescent agents for lubricating oils, waxes, fats, etc.; for brightening agents, especially in polymeric synthetic materials such as polyvinyl chloride, polyacrylonitrile, polyacrylic acid esters, polystyrene, polyvinyl chloride, cellulose acetate, etc. Other agents may also be incorporated in the compositions, and the brightening agents may be used in clear or opaque formulations. The compounds of the invention are, in general, used at concentrations from 0.001% to 0.5% based on the total weight of the composition. However, the preferred amount depends on the particular brightener used and its substrate. At too low a concentration no effect is observed. At too high a concentration quenching of fluorescence occurs. Thus, the compound of the formula

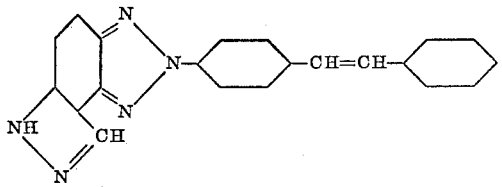

is effective in polystyrene at 0.005% but quenches at 0.05%.

This application is a division of my copending application, Serial No. 798,604, filed March 11, 1959, now abandoned.

My invention can be illustrated by the following examples in which parts are by weight unless otherwise specified.

*Example 1*

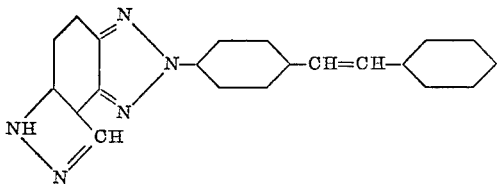

A diazo solution is formed from 1.95 parts of 4-aminostilbene in acetic acid and this is added with stirring to 1.4 parts of 5-aminoindazole dissolved in 50 parts of water containing about 3 parts of hydrochloric acid and about 50 parts of a saturated aqueous solution of sodium acetate. The coupling proceeds rapidly and after stirring for a short time the solid material is removed by filtration, washer with water and dried.

The aminoazo compound is then added to a mixture of 50 parts pyridine, 7.5 parts of 95% ethanol and 20 parts of water. The mixture is heated with stirring and to it is added a solution of 12 parts of copper sulfate pentahydrate, 50 parts of water and 25 parts of concentrated aqueous ammonium hydroxide. After heating at reflux until triazolization is complete the solid material is removed by filtration and washed with water. It is purified by extraction with dilute hydrochloric acid and crystallization from pyridine solution and reprecipitation from an alkaline ethanol solution.

The product, obtained in the form of a tan solid, dissolves in organic solvents, such as pyridine, ethanol and dimethylformamide to give strongly fluorescent solutions.

Similar products containing substituents are obtained by following the same procedure, replacing the 4-aminostilbene with 4-amino-2'-chlorostilbene, 4-amino-3'-methylstilbene, 4-amino-4'-bromostilbene, 4-amino-2'-ethylstilbene, 4-amino-2'-bromostilbene and 4-amino-4'-chlorostilbene. The products obtained are those having the indicated substituents in the stilbene portion of the molecule.

*Example 2*

To 100 parts polystyrene heated to fusion on a 2-roller Thropp mill is added 0.005 part of the product of Example 1. The blend is milled in 75 passes at about 340° F., then moled into chips 2″ x 5″ x 0.05″. The chips show intense blue fluorescence under ultraviolet light, and when viewed by daylight show an attractive white transparency, which contrasts with the grayish appearance of similar polystyrene chips not containing the brightener.

*Example 3*

A blend of 100 parts polystyrene, 0.2 part titanium dioxide (rutile crystals), and 0.005 part of the product of Example 1 is milled in the Thropp mill as in the previous example, and molded into chips. The chips fluoresce intensely under ultraviolet light, and show a clear white opacity by daylight, in marked contrast to the grayish appearance of chips prepared without the brightener.

*Example 4*

A mixture of 100 parts vinyl chloride homopolymer, 50 parts dioctyl phthalate, 2 parts barium-cadmium laurate, and 1 part triaryl phosphite is milled in a Thropp mill at 340–350° C. till fused, whereupon 0.005 part of the product of Example 1 is added and the blend further milled in 40 passes with heating, and molded into sheeting. The sheet shows a blue fluorescence in ultraviolet light, and is relatively white in daylight as compared to the normal yellow hue of polyvinyl chloride sheeting prepared without addition of the brightener.

*Example 5*

To 100 parts of high-pressure (low density) polyethylene resin fused in a Thropp mill is added 0.005 part of the product of Example 1. The milling is continued at 340° F. in 40 passes. The films molded from this blend have a white translucent appearance which is brighter than that of a control film prepared without the brightener.

If in place of the above resin, cellulose acetate polymer is used and blended with the brightener, the resulting film is similarly brighter than a control film.

I claim:

1. A compound of the formula

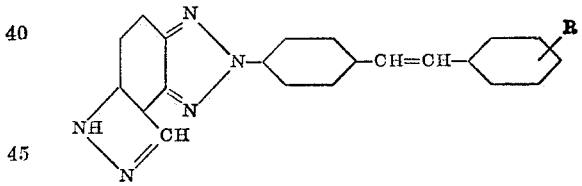

in which R is selected from the group consisting of hydrogen, chloro, bromo and lower alkyl.

2. The compound of the formula

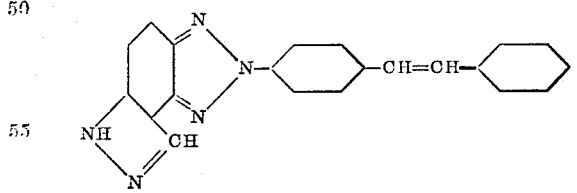

References Cited in the file of this patent

FOREIGN PATENTS

| | | |
|---|---|---|
| 200,143 | Austria | Oct. 25, 1958 |
| 1,183,142 | France | Jan. 26, 1959 |
| 1,199,528 | France | June 22, 1959 |
| 560,579 | Belgium | Mar. 5, 1958 |
| 560,848 | Belgium | Oct. 15, 1957 |
| 565,237 | Belgium | Mar. 15, 1958 |